Nov. 27, 1951  L. W. ATCHISON  2,576,663
TWO-TEMPERATURE REFRIGERATING SYSTEM
Filed Dec. 29, 1948
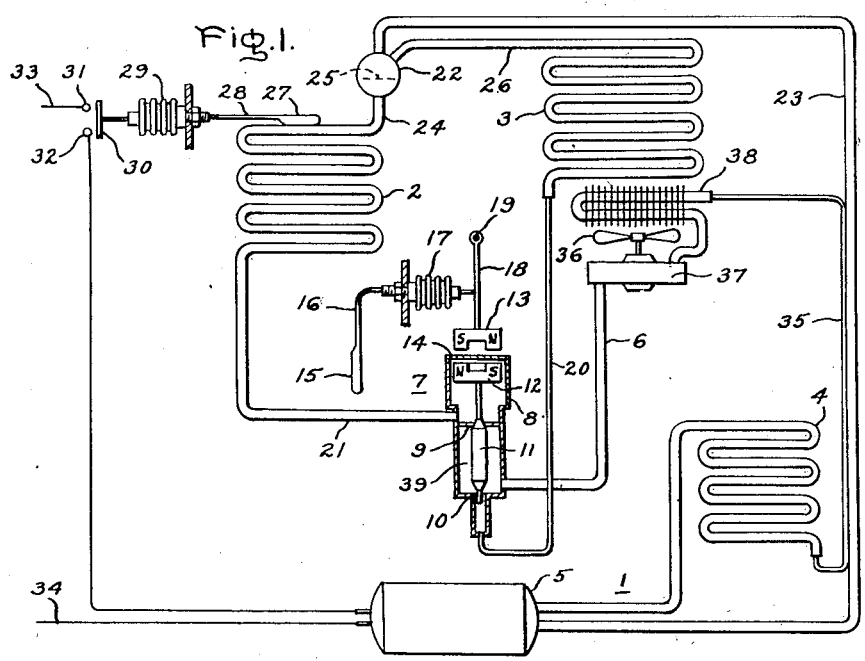
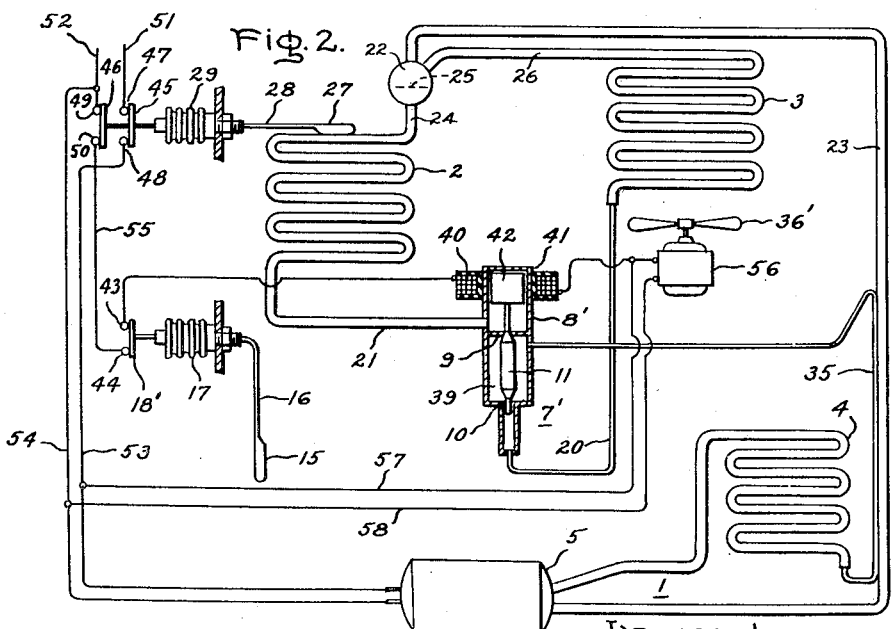
Inventor:
Leonard W. Atchison,
by *William G. Edwards Jr.*
His Attorney.

Patented Nov. 27, 1951

2,576,663

UNITED STATES PATENT OFFICE 2,576,663

TWO-TEMPERATURE REFRIGERATING SYSTEM

Leonard W. Atchison, Erie, Pa., assignor to General Electric Company, a corporation of New York Application December 29, 1948, Serial No. 67,924

9 Claims. (Cl. 62—4)

My invention relates to refrigerating systems and more particularly to refrigerating systems including a fan for circulating air over an evaporator.

Some refrigerators are provided with two compartments, one of which is maintained near zero degrees Fahrenheit for refrigerating frozen foods and the other of which is maintained in the neighborhood of 35 to 40 degrees Fahrenheit for satisfactorily storing fresh foods. To satisfactorily refrigerate these compartments two evaporators may be provided, one of which is maintained at a low temperature for cooling the frozen food compartment and the other of which is maintained at a higher temperature for cooling the fresh food compartment. The latter evaporator may operate over a range of temperatures extending above and below 30 degrees Fahrenheit and it may be desirable to have any frost accumulating during the time refrigerant is being supplied to this evaporator removed during the time when refrigerant is not supplied to this evaporator.

Accordingly, it is an object of my invention to provide a refrigerating system having a low temperature evaporator and a higher temperature evaporator and including provision for facilitating the defrosting of a higher temperature evaporator.

It is another object of my invention to provide a refrigerating system having a low temperature evaporator and a higher temperature evaporator and including an arrangement for circulating air over the higher temperature evaporator for defrosting when the low temperature evaporator is being refrigerated.

It is a further object of my invention to provide a refrigerating system having a low temperature evaporator and higher temperature evaporator and including provision for circulating air over the higher temperature evaporator when refrigerant is being supplied to either of the evaporators.

It is still another object of my invention to provide a refrigerating system including a turbine driven by the refrigerant for circulating air over an evaporator and including another evaporator for effecting a partial expansion of refrigerant before passing to the turbine.

Further objects and advantages of my invention will become apparent as the following description proceeds and the features of novelty which characterize my invention will be pointed out with particularity in the claims annexed to and forming part of this specification.

For a better understanding of my invention reference may be had to the accompanying drawing in which Fig. 1 is a schematic representation of a refrigerating system incorporating my invention, and Fig. 2 is a schematic representation of a refrigerating system embodying a modified form of my invention.

Referring now to Fig. 1 there is shown a refrigerating system including a condensing apparatus 1 and two evaporators 2 and 3 connected in a closed circuit. The condensing apparatus includes a condenser 4 and a motor-compressor unit enclosed within a hermetically sealed case 5 for circulating refrigerant through the closed circuit. The evaporators 2 and 3 are arranged to be supplied in parallel, evaporator 2 being designed to operate at a low temperature, for example, zero degrees Fahrenheit, and evaporator 3 being designed to operate at a higher temperature, for example, over a range from say 25 degrees Fahrenheit to 35 degrees Fahrenheit. The low temperature evaporator 2 may, therefore, be employed for refrigerating the frozen food compartment of a combination refrigerator and the higher temperature evaporator 3 may be utilized for refrigerating the fresh food compartment.

Refrigerant is selectively supplied to either of the evaporators from a common supply line 6 through a control valve 7. The valve 7 includes a housing 8. Within the housing there are provided two spaced valve seats 9 and 10 between which a double-ended valve element 11 is adapted to move for directing refrigerant to one or the other of the evaporators. The position of the valve element is controlled by two cooperating magnets 12 and 13. The magnet 12 is positioned within the housing 8 and is secured to the valve element 11. The magnet 13 is positioned outside the casing generally adjacent the magnet 12. At least the portion 14 of the housing between the two magnets is formed of a nonmagnetic material. The position of the magnet 12 and hence of the valve element 11 is controlled by the position of the magnet 13. Thus, when the magnet 13 is in the position shown in Fig. 1, wherein its poles are positioned generally adjacent the opposite poles of magnet 12, it exerts an attracting force on magnet 12 and moves the valve element into engagement with seat 9 of the valve. The position of the magnet 13 is controlled by thermostatic bulb 15 which is connected by a tube 16 to a bellows 17. The thermostatic bulb 15 may be positioned within the fresh food compartment so as to be responsive to the temperature of the air therein and to control thereby the position of the valve element 11 in response to the temperature of the air in the fresh food compartment. The movable end of the bellows 17 is connected to a rod 18 which is pivoted at 19, the magnet 13 being secured to the movable end of the rod 18. In the position of the valve shown, refrigerant is being supplied to the higher temperature evaporator 3 from the supply line 6 through a restricting conduit 20. When the refrigeration requirements of the fresh food compartment are satisfied, a resultant contraction of the bellows 17 under influence of the thermostatic bulb 16 causes the magnet 13 to move to the left so that its poles are no longer adjacent the opposite poles of magnet 12. The valve element 11 then drops by gravity to engage the valve seat 10 closing the passage to the conduit 20. This shifting of the valve element also moves the element away from the seat 9 and opens a passage to a conduit 21 which conducts refrigerant to the low temperature evaporator 2 from the supply line 6.

Evaporators 2 and 3 are connected to a common header 22 and a suction line 23 conducts vaporized refrigerant from the header 22 to the compressor within the case 5. The evaporator 2 is connected to the header by a conduit 24 which is positioned beneath the level of liquid refrigerant in the header, this level being indicated at 25, so as to maintain the low temperature evaporator 2 flooded when the higher temperature evaporator 3 is refrigerating. The higher temperature evaporator 3 is connected to the header 22 by a conduit 26 which enters the header above the level 25 of the liquid refrigerant therein. The starting and stopping of the motor-compressor unit within the case 5 is controlled by a thermostatic bulb 27 which is positioned in heat exchange relationship with the evaporator 2. This bulb is connected by a tube 28 to a bellows 29. The movable end of the bellows operates a switch element 30 to engage and disengage contacts 31, 32, thereby closing and opening a circuit to the motor of the motor-compressor unit from power lines 33, 34.

Liquid refrigerant is directed from the condenser 4 toward the evaporators through a restricting, or capillary, tube 33, this tube being maintained in heat exchange relationship with the suction line 23 along a portion of its length. A fan 36 is provided for circulating air over the higher temperature evaporator 3. In order to drive the fan 36 a turbine 37 is provided. This turbine may be of any conventional construction and is positioned in the path of refrigerant flowing from the capillary tube 35 to the supply line 6, the motive power for the turbine being supplied by the refrigerant as it passes through the turbine.

In order to increase the amount of energy supplied to the turbine, a third evaporator 38 is positioned in the refrigerant circuit between capillary tube 35 and the turbine 37. This evaporator 38, like the evaporator 3, is positioned within the fresh food compartment and it effects a partial vaporization and expansion of the liquid refrigerant as it passes through the evaporator 38. This serves two purposes. First, the partially expanded refrigerant occupies a greater volume and hence passes through the turbine at a greater velocity than the corresponding amount of liquid refrigerant. Accordingly, an increased amount of energy is imparted to the turbine. Secondly, the refrigerant expanding in the evaporator 38 has a refrigerating effect which is added to that of the evaporator 3 for cooling the fresh food compartment.

Considering the system as a whole, it can be seen that the fan 36 is actuated by the refrigerant flowing through the turbine 37 whenever the condensing apparatus is operated; that is, the fan is driven for circulating air over the higher temperature evaporator 3 whenever either of the evaporators 2 or 3 is being refrigerated. During the time when refrigerant is being supplied to the evaporator 3 the fan 36 is effective to maintain a circulation of air within the fresh food compartment so as to maintain a more uniform temperature throughout the compartment. During the time when refrigerant is being supplied to the low temperature evaporator 2 the fan is effective for facilitating removal of any frost which may have accumulated on evaporator 3 during its refrigerated period. The amount of this frost will normally be small since it is not contemplated that the evaporator 3 will operate below 32° Fahrenheit for extended periods of time. The circulation of air across the evaporator by the fan 36 during a non-refrigerating period of the evaporator 3 facilitates the rapid removal of any frost which may have accumulated and assures that all of the frost is removed before the next refrigerating period of the evaporator 3.

During operation of this system a substantial amount of liquid refrigerant is normally maintained within the chamber 39 of the valve housing 8. This liquid is available for priming the higher temperature evaporator 3 when refrigeration of this evaporator is required. This priming of evaporator 3 is required for best efficiency since it normally contains no liquid refrigerant at the instant that its refrigeration is initiated, all, or nearly all, of the liquid refrigerant being in the colder evaporator 2. Without such priming it would be necessary to first evaporate a quantity of refrigerant from low temperature evaporator 2 before refrigeration could start in evaporator 3, and, even then, it would not have an adequate supply to refrigerate it properly. By maintaining a reservoir of liquid refrigerant in the chamber 39, a substantial quantity of liquid refrigerant is supplied to the evaporator 3 from the chamber 39 through the conduit 20 as soon as the valve element 11 moves to the position shown in Fig. 1. This quantity of refrigerant fills a large portion of the evaporator 3 and, since the compressor cannot handle the resulting vaporized refrigerant at the low pressure corresponding to that of evaporator 2, the pressure quickly builds up, resulting in operation of the evaporator 3 at a higher temperature and pressure and hence in operation of the system at a higher efficiency. Thus, by maintaining an adequate liquid supply in chamber 39 and releasing this liquid refrigerant at the proper rate to evaporator 3 when required, refrigeration starts immediately in evaporator 3 and vaporization takes place at a higher temperature and pressure than that in evaporator 2, with resulting greater efficiency. The above-described construction including the reservoir of liquid refrigerant for supplying a substantial quantity of liquid refrigerant to the higher temperature evaporator when the valve 11 opens is not part of the present invention but is described and claimed in my copending application Serial No. 88,708, filed April 21, 1949, and assigned to the same assignee as the present application.

A modified form of my invention is shown in Fig. 2. The refrigerating system illustrated in Fig. 2 is similar to that previously described and corresponding parts have been identified by the same numerals. Thus, the refrigerating system includes a condensing apparatus 1, consisting of a condenser 4 and a motor-compressor unit within a hermetically sealed case 5, and it further includes a low temperature evaporator 2 and a higher temperature evaporator 3. The evaporators 2 and 3 are connected by conduits 24 and 26, respectively, to a header 22, and vaporized refrigerant is withdrawn from the header through suction line 23.

In the form shown in Fig. 2 the turbine 37 is omitted and liquid refrigerant is supplied through the capillary tube 35 directly to the chamber 39 of a housing 8' of a valve 7'. From the chamber 39 the refrigerant may pass through a conduit 21 to the low temperature evaporator 2 or through a restricting conduit 20 to the higher temperature evaporator 3. The direction of flow of liquid refrigerant is controlled by the valve element 11 which is arranged to engage either a seat 9 or a seat 10, as in the form previously described. In order to control the position of the valve element 11 a solenoid 40 is provided surrounding the upper portion 41 of the housing 8'. An armature 42 is secured to the upper end of the valve element 11, and this armature is actuated by the solenoid 40. In order that the solenoid may properly act on the armature 42, the portion 41 of the housing is made of a non-magnetic material. When the solenoid 40 is energized the valve element is lifted to the position shown in Fig. 2 wherein the valve element 11 engages the seat 9 and liquid refrigerant is directed to the higher temperature evaporator 3. When the solenoid is de-energized the valve element 11 falls by gravity to engage the valve seat 10 and liquid refrigerant is then directed from the capillary tube 35 and the chamber 39 through the conduit 21 to the evaporator 2.

In order to control the position of the valve element 11 a thermostatic bulb 15, which, as in the system previously described, is responsive to the box air temperature of the fresh food compartment, is provided. This bulb 15 is connected by a tube 16 to a bellows 17. The movable end of the bellows 17 is adapted to actuate a switch arm 18' for engaging the contacts 43, 44, to close a circuit through the solenoid 40. It can be seen that when the box air temperature is high the bulb 15 causes the bellows to expand to close the circuit through the contacts 43, 44, and to energize the solenoid 40, lifting the valve element 11 and allowing flow of refrigerant to the higher temperature evaporator 3. When the temperature within the fresh food compartment has been reduced to a predetermined minimum, the bellows 17 contracts to break the circuit through the solenoid and the valve element 11 falls by gravity to direct refrigerant to the low temperature evaporator 2.

The starting and stopping of the motor-compressor unit within the case 5 is controlled by a thermostatic bulb 27 which is positioned on the low temperature evaporator 2. This bulb is connected by tube 28 to a bellows 29. The movement of the bellows 29 controls two switch arms 45 and 46 which are adapted to engage contacts 47, 48, and 49, 50, respectively. Engagement of a switch arm 45 with contacts 47, 48 closes a circuit from power lines 51, 52 to the motor of the motor-compressor unit within the case 5. This circuit extends through the lines 53, 54. The engagement of the switch arm 46 with the contacts 49, 50 closes a circuit from the power line 52 through a line 55 to contact 44. This completes the circuit of the solenoid 40 so that the energization of the solenoid 40 depends not only on the engaging of the contacts 43, 44, by the switch arm 18' in response to a predetermined maximum box air temperature but also on the engaging of the contacts 49, 50, by the switch arm 46 in response to a predetermined maximum temperature of the evaporator 2.

As mentioned above, the turbine 37 is omitted in the form shown in Fig. 2 and a fan 36' for circulating air over the higher temperature evaporator 3 is driven by a motor 56. The motor 56 is energized whenever the motor-compressor unit is operating. It can be seen that the motor 56 is connected across the lines 53, 54 by lines 57, 58 so that power is supplied to the motor 56 at the same time that power is supplied to the motor of the motor-compressor unit. The starting and stopping of the motor-compressor unit and of the fan motor 56 are controlled by the engagement of the switch arm 45 with the contacts 47 and 48. It can be seen therefore that, as in the arrangement illustrated in Fig. 1, the fan 36 is operated to circulate air over the evaporator 3 whenever either the evaporator 2 or the evaporator 3 is being refrigerated. Thus, the fan serves the dual purpose of circulating air within the fresh food compartment to maintain a more uniform temperature when the evaporator 3 is being refrigerated and of circulating air over the evaporator 3 during the time when evaporator 3 is not being refrigerated to facilitate the removal of any frost from that evaporator.

While I have shown and described specific embodiments of my invention, I do not desire my invention to be limited to the particular construction shown and described and I intend, by the appended claims, to cover all modifications within the spirit and scope of my invention.

What I claim as new and desire to secure by Letters Patent of the United States is:

1. In the refrigerating system, a low temperature evaporator, a higher temperature evaporator, condensing apparatus for circulating refrigerant in the system, means for selectively directing refrigerant to either of said evaporators, a fan for circulating air over said higher temperature evaporator, means for driving said fan, and means operative at all times that refrigerant is supplied to either of said evaporators for actuating said driving means.

2. In a refrigerating system a low temperature evaporator, a higher temperature evaporator, condensing apparatus for circulating refrigerant in the system, means for selectively directing refrigerant to either of said evaporators, a fan for circulating air over said higher temperature evaporator, and means energized at all times that said condensing apparatus is operating for driving said fan.

3. In the refrigerating system, a low temperature evaporator, a higher temperature evaporator, condensing apparatus for circulating refrigerant in the system, means for selectively directing refrigerant to either of said evaporators, and a turbine driven by said refrigerant during operation of said condensing apparatus for circulating air over said higher temperature evaporator.

4. In the refrigerating system, a low temperature evaporator, a higher temperature evaporator, condensing apparatus for circulating refrigerant in the system, means for selectively directing refrigerant to either of said evaporators, a third evaporator for receiving refrigerant from said condensing apparatus, and a turbine driven by said refrigerant during operation of said condensing apparatus for circulating air over said higher temperature evaporator and over said third evaporator, said refrigerant being discharged from said third evaporator to said turbine for driving said turbine.

5. In a refrigerating system, a low temperature evaporator, a higher temperature evaporator, condensing apparatus for circulating refrigerant in the system, means for selectively directing refrigerant to either of said evaporators, a turbine driven by said refrigerant for circulating air over said higher temperature evaporator, and a third evaporator receiving refrigerant from said condensing apparatus and discharging said refrigerant to said turbine, said third evaporator effecting a partial vaporization and expansion of said refrigerant, said turbine also effecting circulation of air over said third evaporator.

6. In a refrigerating system, a low temperature evaporator, a higher temperature evaporator, condensing apparatus for circulating refrigerant in the system, a valve for selectively directing refrigerant to either of said evaporators, a fan for circulating air over said higher temperature evaporator, a turbine for driving said fan and a third evaporator for receiving refrigerant from said condensing apparatus and discharging said refrigerant to said turbine, said third evaporator effecting a partial vaporization and expansion of said refrigerant, said fan also circulating air over said third evaporator.

7. In the refrigerating system, a low temperature evaporator, a higher temperature evaporator, condensing apparatus for circulating refrigerant in the system, means for selectively directing refrigerant to either of said evaporators, a fan for circulating air over said higher temperature evaporator, and a motor for driving said fan, said condensing apparatus including terminals for connecting said condensing apparatus to a source of power supply, said motor being connected directly across said terminals of said condensing apparatus whereby said motor is energized for driving said fan at all times that said condensing apparatus is operating.

8. In a refrigerating system including a condensing apparatus, a turbine, and an evaporator connected for circulating refrigerant in a closed circuit, said turbine being positioned in said circuit between said condensing apparatus and said evaporator and being driven by refrigerant passing through said turbine, and a second evaporator connected in said circuit between said condensing apparatus and said turbine for effecting a partial vaporization and expansion of liquid refrigerant before passage to said turbine.

9. In a refrigerating system, a low temperature evaporator, a higher temperature evaporator, condensing apparatus for circulating refrigerant in closed refrigerant circuit in the system, means for selectively directing refrigerant to either of said evaporators, a fan for circulating air over said higher temperature evaporator, and means connected directly in said refrigerant circuit and dependent upon the supplying of refrigerant to either of said evaporators for driving said fan.

LEONARD W. ATCHISON.

REFERENCES CITED

The following references are of record in the file of this patent:

UNITED STATES PATENTS

| Number | Name | Date |
|---|---|---|
| 2,133,949 | Buchanan | Oct. 25, 1938 |
| 2,133,955 | Buchanan | Oct. 25, 1938 |
| 2,133,956 | Buchanan | Oct. 25, 1938 |
| 2,175,267 | Killeffer | Oct. 10, 1939 |
| 2,359,780 | Muffly | Oct. 10, 1944 |
| 2,394,109 | Sanchey | Feb. 5, 1946 |